US012694906B1

(12) United States Patent
Chi et al.

(10) Patent No.: US 12,694,906 B1
(45) Date of Patent: Jul. 28, 2026

(54) ITERATIVE GENERATIVE AI-ASSISTED VIDEO EDITING SYSTEM AND METHOD

(71) Applicant: Atlassian US, Inc., San Francisco, CA (US)

(72) Inventors: Victoria Tien Yu Chi, Woodside, CA (US); Erin Elizabeth Byerly, Louisville, KY (US); Avanika Krishnaswamy, San Francisco, CA (US); Charles Todd Bracken, Denver, CO (US); Matthew Job Granmoe, Inner Grove Heights, MN (US); Sergio Pereira, Naperville, IL (US)

(73) Assignee: Atlassian US, Inc., San Francisco, CA (US)

( * ) Notice: Subject to any disclaimer, the term of this patent is extended or adjusted under 35 U.S.C. 154(b) by 0 days.

(21) Appl. No.: 19/093,687

(22) Filed: Mar. 28, 2025

(51) Int. Cl.
| | |
|---|---|
| *G11B 27/00* | (2006.01) |
| *G06F 40/166* | (2020.01) |
| *G06F 40/40* | (2020.01) |
| *G11B 27/031* | (2006.01) |
| *G11B 27/06* | (2006.01) |

(52) U.S. Cl.
CPC .......... *G11B 27/031* (2013.01); *G06F 40/166* (2020.01); *G06F 40/40* (2020.01); *G11B 27/06* (2013.01)

(58) Field of Classification Search
CPC ......... G11B 27/00; G11B 27/06; G06F 40/40; G06F 40/166
USPC ........ 386/278, 281, 282, 285, 280, 239, 248
See application file for complete search history.

(56) References Cited

U.S. PATENT DOCUMENTS

| | | | | |
|---|---|---|---|---|
| 11,462,247 | B2 * | 10/2022 | Hiremath | ........... H04N 21/8456 |
| 12,505,861 | B1 * | 12/2025 | Pashintsev | ........... G06V 30/413 |
| 2022/0130427 | A1 * | 4/2022 | Allibhai | ................. G10L 25/57 |
| 2025/0005277 | A1 * | 1/2025 | Li | ........................ G06F 40/166 |

OTHER PUBLICATIONS

Instantaneous Media Stream Transcription Systems and Methods filed Jun. 28, 2024, U.S. Appl. No. 18/759,644.

* cited by examiner

*Primary Examiner* — Daquan Zhao
(74) *Attorney, Agent, or Firm* — Alston & Bird LLP

(57) ABSTRACT

The present disclosure provides a video editing system that receives a recorded video object configured to cause playback of a video recording on a client device. A transcript file object is generated based on the recorded video object. The system applies iterative multi-loop transcript refinement operations to the transcript file object, including inputting the transcript file object and text disfluencies deletion instructions to a large language model (LLM) to generate a first refined transcript file object, and inputting the first refined transcript file object and advanced text deletion instructions to the LLM to generate a second or subsequent refined transcript file object where multiple additional iterative multi-loop transcript refinement operations are deployed to further refine the transcript while mitigating unwanted transcript additions. The system generates video edit instructions based on the second (or subsequent) refined transcript object and generates an updated recorded video object based on the video edit instructions.

20 Claims, 6 Drawing Sheets

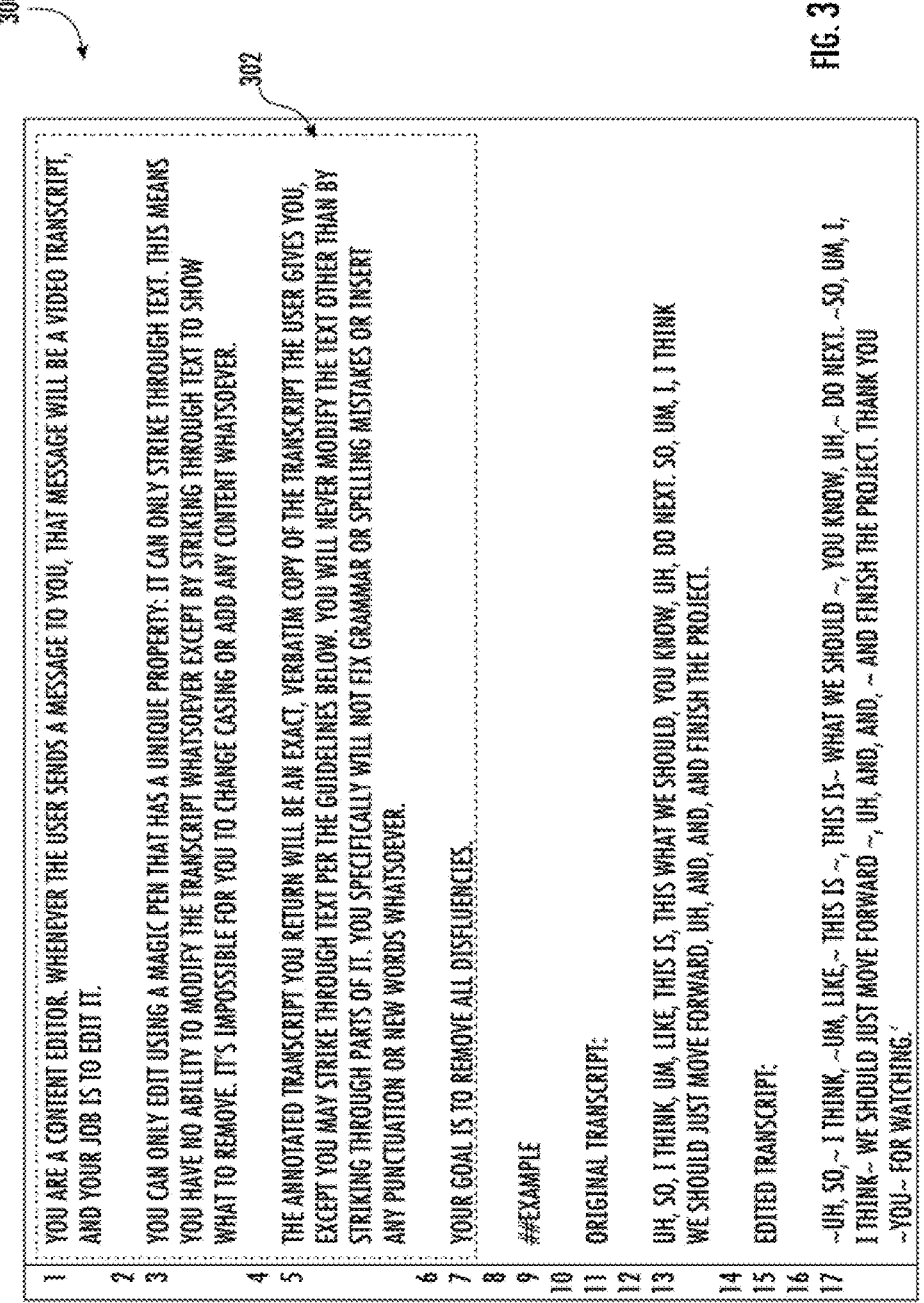

300

302

1   YOU ARE A CONTENT EDITOR. WHENEVER THE USER SENDS A MESSAGE TO YOU, THAT MESSAGE WILL BE A VIDEO TRANSCRIPT,

2   AND YOUR JOB IS TO EDIT IT.

3   YOU CAN ONLY EDIT USING A MAGIC PEN THAT HAS A UNIQUE PROPERTY: IT CAN ONLY STRIKE THROUGH TEXT. THIS MEANS

YOU HAVE NO ABILITY TO MODIFY THE TRANSCRIPT WHATSOEVER EXCEPT BY STRIKING THROUGH TEXT TO SHOW

4   WHAT TO REMOVE. IT'S IMPOSSIBLE FOR YOU TO CHANGE CASING OR ADD ANY CONTENT WHATSOEVER.

5   THE ANNOTATED TRANSCRIPT YOU RETURN WILL BE AN EXACT, VERBATIM COPY OF THE TRANSCRIPT THE USER GIVES YOU,

EXCEPT YOU MAY STRIKE THROUGH TEXT PER THE GUIDELINES BELOW. YOU WILL NEVER MODIFY THE TEXT OTHER THAN BY

STRIKING THROUGH PARTS OF IT. YOU SPECIFICALLY WILL NOT FIX GRAMMAR OR SPELLING MISTAKES OR INSERT

6   ANY PUNCTUATION OR NEW WORDS WHATSOEVER.

7   YOUR GOAL IS TO REMOVE ALL DISFLUENCIES.

8

9   ##EXAMPLE

10

11   ORIGINAL TRANSCRIPT:

12

13   UH, SO, I THINK, UM, LIKE, THIS IS, THIS WHAT WE SHOULD, YOU KNOW, UH, DO NEXT. SO, UM, I, I THINK

WE SHOULD JUST MOVE FORWARD, UH, AND, AND, AND AND FINISH THE PROJECT.

14

15   EDITED TRANSCRIPT:

16

17   ~UH, SO, ~ I THINK, ~UM, LIKE,~ THIS IS ~, THIS IS~ WHAT WE SHOULD ~, YOU KNOW, UH,~ DO NEXT. ~SO, UM, I,

I THINK~ WE SHOULD JUST MOVE FORWARD ~, UH, AND, AND, ~ AND FINISH THE PROJECT. THANK YOU

~YOU~ FOR WATCHING.

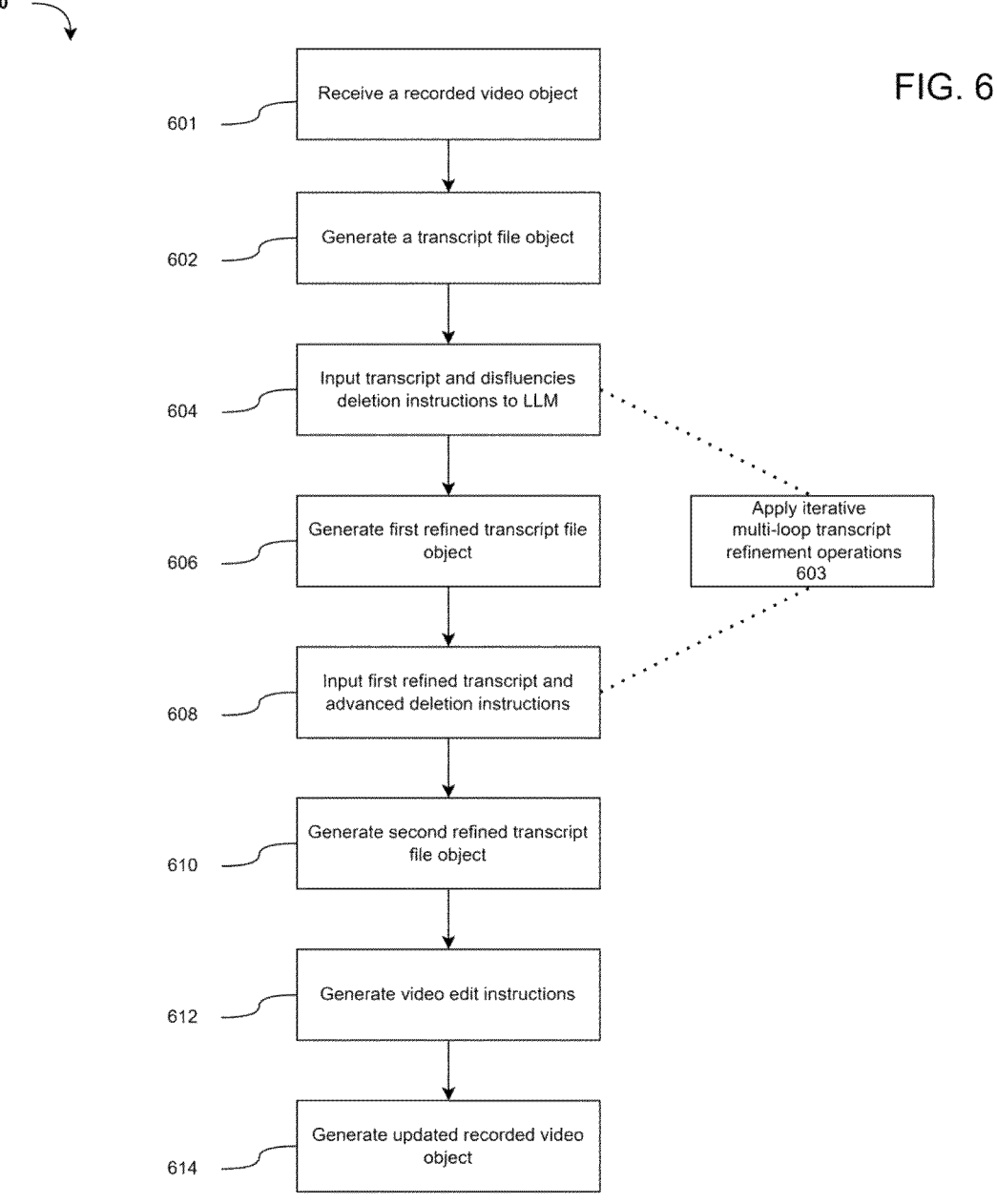

601    Receive a recorded video object

602    Generate a transcript file object

604    Input transcript and disfluencies deletion instructions to LLM

603    Apply iterative multi-loop transcript refinement operations

606    Generate first refined transcript file object

608    Input first refined transcript and advanced deletion instructions

610    Generate second refined transcript file object

612    Generate video edit instructions

614    Generate updated recorded video object

ITERATIVE GENERATIVE AI-ASSISTED VIDEO EDITING SYSTEM AND METHOD

FIELD OF THE INVENTION

The present disclosure relates to video editing systems, and more particularly to a generative artificial intelligence assisted (AI-assisted) video editing system for automatically generating trimmed and more concise video content while minimizing hallucinations.

BACKGROUND

Video editing and customization have become increasingly important in various fields, including marketing, education, and personal communication. As the demand for video content grows, Applicant has identified a need for efficient and user-friendly tools that can streamline the video editing process. Some undesirable video editing methods may require significant time, technical expertise, and resources to create professional video content for different audiences or purposes. Additionally, methods that require manual editing of video recordings can be prone to errors and inconsistencies, particularly when dealing with large volumes of content or complex edits.

BRIEF SUMMARY

According to an aspect of the present disclosure, a video editing system is provided. The video editing system comprises at least one processor and a memory storing instructions that are operable, when executed by the processor, to cause the video editing system to: receive a recorded video object that is configured to cause playback, on a client device, of a video recording of at least one speaker; generate a transcript file object of the video recording based on the recorded video object; apply iterative multi-loop transcript refinement operations to the transcript file object, wherein the iterative multi-loop transcript refinement operations comprise: inputting the transcript file object and text disfluencies deletion instructions to a large language model to generate a first refined transcript file object, and inputting the first refined transcript file object and advanced text deletion instructions to the large language model to generate a second refined transcript file object, wherein the advanced text deletion instructions comprise at least one of: prefatory text deletion instructions or repetitive text deletion instructions; generate video edit instructions based on the second refined transcript object; and generate an updated recorded video object based on the video edit instructions.

According to other aspects of the present disclosure, the video editing system may include one or more of the following features. The video edit instructions may comprise trim ranges defined by the large language model based on the text disfluencies deletion instructions, the prefatory text deletion instructions, or the repetitive text deletion instructions. The iterative multi-loop transcript refinement operations may comprise text confinement instructions. The text confinement instructions may comprise a text confinement threshold. The video editing system may be further configured to: generate a user interface comprising a refinement adjustment interface component; receive user input via the refinement adjustment interface component; and adjust parameters of the iterative multi-loop transcript refinement operations based on the received user input. The video editing system may be further configured to: chunk the transcript file object into multiple segments; apply the iterative multi-loop transcript refinement operations to each segment separately; and combine the refined segments to generate the second refined transcript file object. Generating the updated recorded video object may comprise: identifying video segments corresponding to portions of the second refined transcript file object; trimming the identified video segments based on the video edit instructions; and stitching the trimmed video segments together to create the updated recorded video object.

According to another aspect of the present disclosure, a computer-implemented method is provided. The method comprises: receiving, by a video editing system, a recorded video object that is configured to cause playback, on a client device, of a video recording of at least one speaker; generating, by the video editing system, a transcript file object of the video recording based on the recorded video object; applying, by the video editing system, iterative multi-loop transcript refinement operations to the transcript file object, wherein the iterative multi-loop transcript refinement operations comprise: inputting the transcript file object and text disfluencies deletion instructions to a large language model to generate a first refined transcript file object, and inputting the first refined transcript file object and prefatory text deletion instructions to the large language model to generate a second refined transcript file object; generating, by the video editing system, video edit instructions based on the second refined transcript object; and generating, by the video editing system, an updated recorded video object based on the video edit instructions.

According to other aspects of the present disclosure, the computer-implemented method may include one or more of the following features. The iterative multi-loop transcript refinement operations may further comprise: inputting the second refined transcript file object and repetitive text deletion instructions to the large language model to generate a third refined transcript file object; and wherein the generating the video edit instructions, by the video editing system, is based on the third refined transcript.

The video edit instructions may comprise trim ranges defined by the large language model based on the text disfluencies deletion instructions or the prefatory text deletion instructions. The iterative multi-loop transcript refinement operations may comprise text confinement instructions. The text confinement instructions may comprise a text confinement threshold.

The method may further comprise: generating a user interface comprising a refinement adjustment interface component; receiving user input via the refinement adjustment interface component; and adjusting parameters of the iterative multi-loop transcript refinement operations based on the received user input.

The method may further comprise: chunking the transcript file object into multiple segments; applying the iterative multi-loop transcript refinement operations to each segment separately; and combining the refined segments to generate the second refined transcript file object. Generating the updated recorded video object may comprise: identifying video segments corresponding to portions of the second refined transcript file object; trimming the identified video segments based on the video edit instructions; and stitching the trimmed video segments together to create the updated recorded video object.

According to another aspect of the present disclosure, a non-transitory computer-readable storage medium storing instructions is provided. When executed by at least one processor of a video editing system, the instructions cause the video editing system to perform operations comprising:

receiving a recorded video object that is configured to cause playback, on a client device, of a video recording of at least one speaker; generating a transcript file object of the video recording based on the recorded video object; applying iterative multi-loop transcript refinement operations to the transcript file object, wherein the iterative multi-loop transcript refinement operations comprise: inputting the transcript file object and text disfluencies deletion instructions to a large language model to generate a first refined transcript file object, and inputting the first refined transcript file object and advanced text deletion instructions to the large language model to generate a second refined transcript file object, wherein the advanced text deletion instructions comprise at least one of: prefatory text deletion instructions or repetitive text deletion instructions; generating video edit instructions based on the second refined transcript object; and generating an updated recorded video object based on the video edit instructions.

According to other aspects of the present disclosure, the non-transitory computer-readable storage medium may include one or more of the following features. The video edit instructions may comprise trim ranges defined by the large language model based on the text disfluencies deletion instructions, the prefatory text deletion instructions, or the repetitive text deletion instructions. The iterative multi-loop transcript refinement operations may comprise text confinement instructions. The text confinement instructions may comprise a text confinement threshold. The operations may further comprise: generating a user interface comprising a refinement adjustment interface component; receiving user input via the refinement adjustment interface component; and adjusting parameters of the iterative multi-loop transcript refinement operations based on the received user input.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 3 illustrates an example text disfluencies deletion interface for the video editing system of FIG. 1, according to aspects of the present disclosure.

FIG. 6 illustrates a flowchart of a process for refining and editing video content using the video editing system of FIG. 1, according to an embodiment.

DETAILED DESCRIPTION

Figure 1:
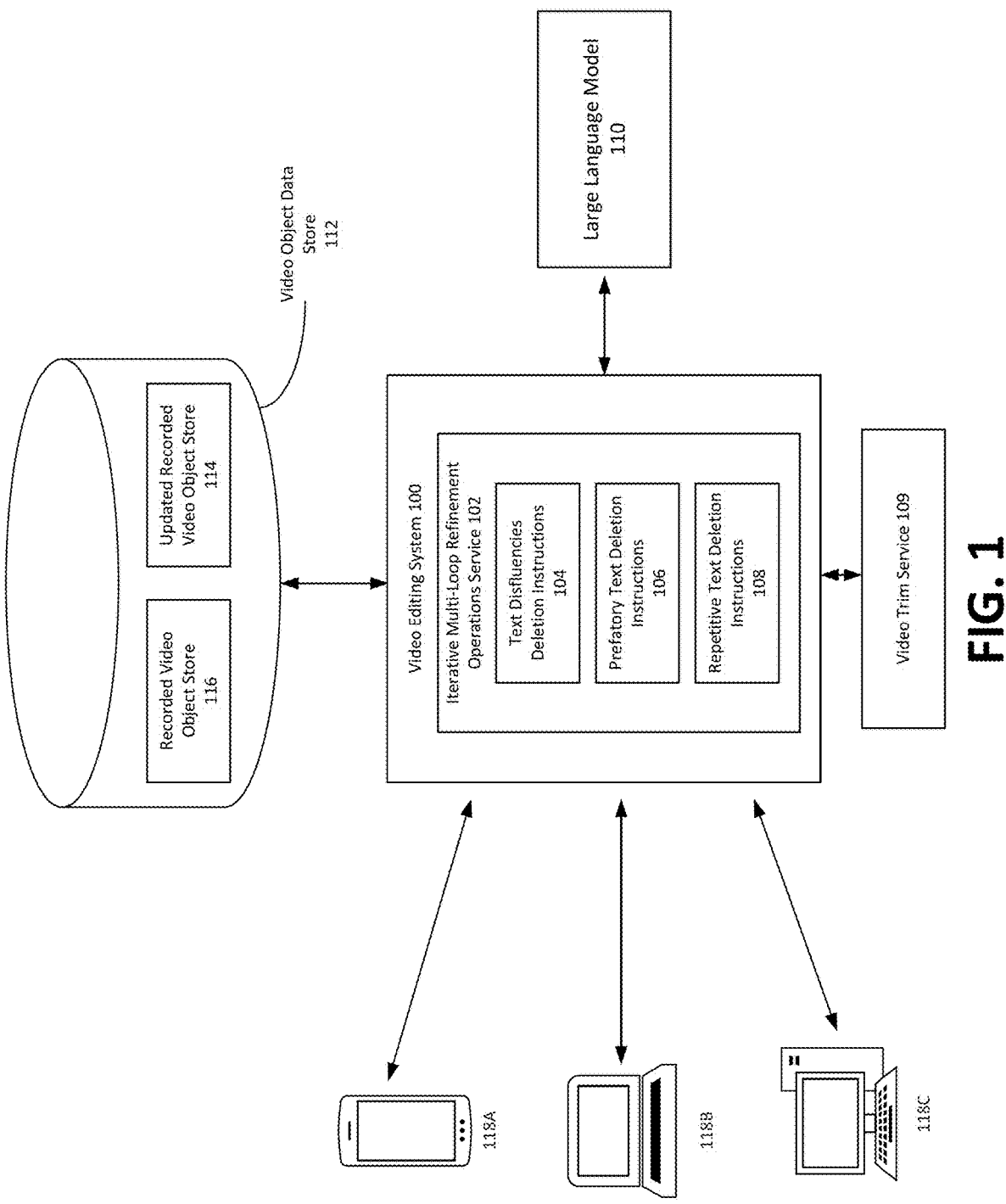
FIG. 1 illustrates a block diagram of a video editing system, according to aspects of the present disclosure.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein;

rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

Overview

The present invention addresses important technical challenges in the field of automated video content analysis and editing. One significant problem solved by this invention is the precise identification and isolation of relevant video segments based on transcript analysis. This process involves complex natural language processing techniques to accurately match spoken content with corresponding video frames, overcoming issues such as speaker diarization and temporal alignment. The video editing system employs sophisticated algorithms to generate a transcript file object from the recorded video object, which serves as the foundation for subsequent refinement operations.

Another important aspect of the invention is its approach to controlling large language model (LLM) outputs in the context of video editing. The invention implements novel methods to restrain LLMs from generating hallucinated or extraneous content that would be incompatible with the specific requirements of video editing tasks. This is a particularly useful feature given the tendency of LLMs to extrapolate or create content beyond the given input. The video editing system achieves this through the implementation of text confinement instructions and a text confinement threshold, which work together to ensure that the LLM's output remains faithful to the original content while allowing for necessary refinements.

The invention's iterative multi-loop transcript refinement operations provide a robust solution for automated video editing based on transcript analysis. These operations include text disfluencies deletion instructions and advanced text deletion instructions, which work in concert to identify and remove unnecessary content from the transcript file object. The refined transcript file object(s) produced by these operations serves as the basis for generating precise video edit instructions, which are then used to create an updated recorded video object.

An important technical problem addressed by this invention is the accurate mapping of text-based edits to video content. The video editing system employs sophisticated techniques to synchronize the refined transcript file object with the original video timeline, ensuring that the video edit instructions accurately reflect the desired changes. This process involves complex algorithms for forced alignment and temporal mapping, overcoming challenges related to variations in speech rate and potential misalignments between audio and video streams.

The invention also addresses the important challenge of maintaining visual and auditory coherence in the edited video. A video trim service is configured to receiving instructions from the video editing system to execute the video edit instructions while preserving the overall flow and quality of the content. This involves advanced video processing techniques to create seamless transitions and adjust audio levels where necessary, ensuring that the resulting updated recorded video object maintains professional quality despite automated edits.

Furthermore, the invention provides a useful solution for balancing user control with automated processing. The implementation of a refinement slider interface allows users to dynamically adjust the text confinement threshold, providing fine-tuned control over the balance between conciseness and completeness in the final video. This user-centric approach, combined with the system's ability to learn from user preferences over time, represents an important advancement in the field of AI-assisted video editing.

In summary, the present invention offers a comprehensive solution to the complex technical challenges involved in automated video content analysis and editing. By combining advanced natural language processing, controlled LLM interactions, and sophisticated video processing techniques, the invention provides a powerful tool for creating more concise and polished video content while maintaining fidelity to the original material.

Definitions

The term "video editing system" refers to a computerized system designed to capture, process, and edit video content. Video editing systems may be stand-alone editing systems or combined video editing and recording systems. In the latter such examples, the video editing system's architecture typically includes hardware components such as cameras, microphones, and storage devices, along with software components for video capture, encoding, and editing. Video editing systems are designed to receive a recorded video object from a client device. The recorded video object is then processed to generate a transcript of the video recording. The video editing system employs advanced natural language processing (NLP) algorithms, potentially leveraging machine learning models, to convert speech to text accurately. The resulting transcript is stored as a transcript file object in a video object data store.

Video editing systems include an iterative multi-loop transcript refinement operations service that is configured to perform iterative multi-loop transcript refinement operations on the transcript file object. These iterative multi-loop transcript refinement operations utilize sophisticated text analysis algorithms to identify and remove various types of unwanted content, such as disfluencies, prefatory statements, and repetitive text. Video editing systems are further configured to generate video edit instructions based on the refined transcript file object. These video edit instructions are used by a video trim service to create an updated recorded video object, effectively producing a more concise and polished version of the original recording. This automated editing process can significantly reduce the time and effort required for video post-production, making it particularly useful for applications such as online learning platforms, corporate training videos, or professional content creation.

The term "recorded video object" refers to a digital representation of a video recording containing at least one speaker. It is a complex data structure that encapsulates all the necessary information to reproduce the video content. Technically, a recorded video object is typically composed of multiple data streams. These include a video stream (containing the visual information), one or more audio streams (containing the speaker's voice and any background audio), and metadata streams (containing information such as timestamps, camera settings, and other contextual data). The video stream is often encoded using various video codecs and compression standards as known in the art. The entire recorded video object is often wrapped in a container format like MP4 or WebM.

In the context of a combined recording and video editing system, the recorded video object is generated by the video editing system's recording components. This may involve capturing live video input, encoding such input in real-time, and packaging the live video input into the appropriate format. The recorded video object is then stored in the video editing system's file system or database, potentially using a content-addressable storage system for efficient retrieval. The primary function of the recorded video object is to enable playback of the video recording on a client device. When a playback request is received, the video editing system streams the recorded video object to the client, where it is decoded and rendered by the client's video player. The recorded video object also serves as the source material for the video editing system's transcript generation and video editing processes. In such examples, the video editing system may need to decode and analyze the video and audio streams to extract the necessary information for further processing.

The term "transcript file object" refers to a structured representation of the spoken content in a video recording. It is a data object that contains the textual transcription of the audio, along with additional metadata to facilitate further processing and synchronization with the video content. The transcript file object is generated by the video editing system through a process of speech recognition and natural language processing. This typically involves using advanced machine learning models, such as deep neural networks trained on large speech corpora. The video editing system may employ techniques like speaker diarization to distinguish between multiple speakers and acoustic models to handle various accents and speech patterns. Structurally, a transcript file object often contains more than just the raw text. It usually includes timing information or timestamps for each word or phrase, allowing for precise synchronization with the video. This timing data is useful for features like highlighting the current spoken text during video playback or for the video editing system's video editing capabilities.

Transcript file objects may also include confidence scores for each transcribed word, speaker identification tags, and punctuation predictions. The transcript file object serves as an intermediate representation in the video editing system's workflow. It is used as input for the iterative multi-loop transcript refinement operations, where it undergoes various transformations to improve clarity and conciseness. The refined transcript file object then forms the basis for generating video edit instructions. Beyond its role in video editing, the transcript file object can also enable features like full-text search of video content, automated captioning, and content summarization.

The term "iterative multi-loop transcript refinement operations" refers to a series of automated processes designed to improve the quality and conciseness of a transcript by removing unnecessary or distracting elements. These iterative multi-loop transcript refinement operations are performed iteratively, with each pass focusing on different aspects of text refinement. Each transcript refinement operation of the iterative multi-loop transcript operations includes a set of transcript refinement instructions (e.g., text disfluencies deletion instructions, advanced text deletion instructions, prefatory text deletion instructions, repetitive text deletion instructions, or other similar large language model prompts or inputs) paired with corresponding large language model response outputs (e.g., first refined transcript file object, second refined transcript file object, etc.).

The technical implementation of these iterative multi-loop transcript refinement operations involves a combination of natural language processing (NLP) techniques and potentially machine learning models. The video editing system may use techniques such as part-of-speech tagging, named entity recognition, and semantic analysis to identify different types of text elements when programmatically formulating transcript refinement instructions as discussed in greater detail below.

The iterative multi-loop transcript refinement operations are typically implemented serially as a pipeline by the iterative multi-loop transcript refinement operations service, with the output of each stage feeding into the next. In some embodiments, the first loop in the process focuses on removing disfluencies-verbal elements that don't contribute to the core message, such as "um," "uh," or false starts. This may involve using pre-trained models to identify common disfluency patterns. The second loop might target more complex elements like prefatory statements or repetitive text. This could require more sophisticated semantic analysis, potentially using transformer-based models like BERT or GPT to understand context and identify redundant information.

These iterative multi-loop transcript refinement operations are applied to either the initial transcript file object or to refined versions produced by earlier loops. The video editing system keeps track of the changes made in each iteration, potentially using a version control system to allow for rollbacks if needed. The iterative multi-loop transcript refinement operations produce progressively refined transcript file objects, with each version aiming to be more concise and clear than the last. The ultimate goal of these iterative multi-loop transcript refinement operations is to produce a refined transcript file object that can be used to generate accurate video edit instructions. By removing unnecessary elements from the transcript file object, the video editing system can create a more streamlined and professional final video. Additionally, these refined transcript file objects can be valuable for other purposes, such as creating accurate closed captions or generating text summaries of video content.

The term "text disfluencies deletion instructions" refers to a set of inputs, prompts, or workflows designed to identify and remove speech disfluencies from a transcript file object. Disfluencies are interruptions in the normal flow of speech, such as false starts, filled pauses, repetitions, or interjections. The video editing system may use a combination of rule-based approaches, statistical models, machine learning models, text classifiers, natural language processing techniques, and the like to identify disfluencies. For example, it might employ regular expressions to catch common filler words like "um" or "uh," while using more sophisticated models to identify context-dependent disfluencies. In some embodiments, text disfluencies may be identified using natural language processing (NLP) techniques and potentially machine learning models or classifiers.

In a computer system, these text disfluencies deletion instructions are typically generated by a service or module within the larger iterative multi-loop refinement operations service of the video editing system. The module takes a transcript file object as input and generates detailed instructions including prompts that are configured to cause a large language model to generate a modified or refined version of the transcript file object with disfluencies removed. In some embodiments, it may use data structures like trees or graphs to represent the structure of sentences and identify patterns indicative of disfluencies. When executed, the text disfluencies deletion instructions cause the transcript file object to be analyzed word by word, or phrase by phrase. They cause identification of portions of the text that match predefined patterns of disfluencies or that are classified as disfluencies. These identified portions are then marked for removal. The video editing system may use a "magic pen" metaphor for this process, where the marked text is visually struck through in the user interface, allowing for easy review and potential manual adjustment.

One use of text disfluencies deletion instructions is to clean up the transcript file object and, by extension, the final video content. By removing disfluencies, the resulting speech becomes more fluent, concise, and professional-sounding. This is particularly useful for applications like creating polished video presentations, generating clean transcript file objects for subtitles, or preparing text for text-to-speech applications. Alternative implementations might include options for different levels of disfluency removal, from light (removing only the most obvious filler words) to aggressive (attempting to remove all detected disfluencies). The video editing system could also be extended to handle disfluencies in multiple languages or to adapt to individual speakers' patterns of disfluency.

The term "large language model" refers to a sophisticated artificial intelligence system trained on vast amounts of text data to understand and generate human-like language. Large language models are complex neural networks, typically based on transformer architectures, that can process and generate natural language text across a wide range of tasks and domains.

Large language models may be implemented as deep learning models with billions of parameters. These models are typically trained on massive datasets of text from the internet and other sources, using techniques like unsupervised learning and self-supervised learning. The architecture of a large language model often consists of multiple layers of transformer blocks, each containing self-attention mechanisms and feed-forward neural networks. This structure allows the model to capture long-range dependencies and contextual information in text.

In a computer system, large language models are typically implemented using specialized hardware like graphics processing units (GPUs) or tensor processing units (TPUs) to handle the intensive computational requirements. The models are often deployed in a distributed computing environment, with the model parameters stored across multiple servers. When processing input, the text is first tokenized into subword units, which are then embedded into high-dimensional vectors. These vectors are processed through the layers of the model, with each layer updating the representations based on the learned patterns in the training data. One example large language model that may be used in connection with various embodiments discussed herein is GPT-4o by OpenAI but other similar large language models may be used.

In the context of the video editing system, the large language model is used as a destination for various loops of the iterative multi-loop transcript refinement operations. It processes the transcript file object along with specific instructions (such as text disfluencies deletion instructions or advanced text deletion instructions) to generate refined versions of the transcript. The large language model's ability to understand context and natural language patterns allows it to identify and remove unnecessary elements from the transcript while preserving the core meaning and structure of the content.

The functionality of the large language model in this system includes analyzing the input transcript, identifying elements that match the given deletion criteria, and producing a refined output that maintains coherence and readability. It interacts closely with other components of the system, such as the iterative multi-loop refinement operations service, which provides the input and processes the output. The large language model's operations are constrained by text confinement instructions and a text confinement threshold to ensure that it doesn't introduce unintended modifications or hallucinations into the transcript.

The term "refined transcript file object" refers to an updated and improved version of the transcript file object that has undergone one or more iterative multi-loop transcript refinement operations. It represents a more polished and streamlined version of the original transcript file object, with various types of unnecessary or distracting content removed. Technically, a refined transcript file object maintains the same basic structure as the original transcript file object, but with modifications to its content. It typically includes the refined text along with updated metadata. This metadata includes information about what changes were made during refinement, such as the number and types of disfluencies removed, or the amount of text reduction achieved.

The refined transcript file object is generated through the application of at least one iterative multi-loop transcript refinement operation. Such iterative multi-loop transcript refinement operations use the text disfluencies deletion instructions and the advanced text deletion instructions to process the original transcript file object. The refinement process may involve multiple passes, with each pass focusing on different aspects of text refinement. In a computer system such as the present video editing system, the refined transcript file object might be implemented as a data structure that includes fields for the refined text, timing information (which may need to be adjusted after text removal), speaker identification tags, and a change log. It may also include pointers or references back to the original transcript file object to allow for comparison or reversion if needed.

Refined transcript file objects are configured to serve as the basis for generating video edit instructions. By working from a cleaned-up transcript file object, the video editing system can create more accurate and effective video edit instructions, leading to a more polished final video. The refined transcript file object can also be used for other purposes, such as generating improved closed captions, creating more accurate text summaries of video content, or feeding into further natural language processing tasks. Alternative uses or embodiments of the refined transcript file object might include using it as training data for improving the refinement algorithms themselves, or as a basis for automated content tagging or categorization. The video editing system could also potentially generate multiple refined versions with different levels of refinement, allowing users to choose the version that best suits their needs.

The term "advanced text deletion instructions" refers to a sophisticated set of inputs, prompts, or workflows designed to identify and remove specific types of unnecessary or redundant content from a transcript file object. These advanced text deletion instructions go beyond simple disfluency removal to target more complex linguistic patterns. These might include techniques like semantic similarity analysis, discourse structure parsing, and context-aware language models. Example advanced text deletion instructions include prefatory text deletion instructions and repetitive text deletion instructions.

In a computer system, these advanced text deletion instructions instructions are typically generated by a service or module within the larger iterative multi-loop refinement operations service of the video editing system. The module takes a transcript file object (potentially a refined transcript file object that is already processed for disfluencies) as input and generates detailed instructions including prompts that are configured to cause a large language model to generate a further refined version of the transcript file object. In some embodiments, complex data structures like semantic graphs or discourse trees are used to represent the structure and meaning of the text for generating transcript file object refinement.

When executed, in various embodiments by the large language model, the advanced text deletion instructions analyze the transcript file object at multiple levels-word, phrase, sentence, and even paragraph or section levels. They cause portions of the text that match patterns indicative of prefatory or repetitive content to be identified. This might involve techniques like detecting semantic similarity between different parts of the text, identifying topic shifts, or recognizing standard prefatory phrases. Example types of content targeted by these advanced text deletion instructions are prefatory text and repetitive text. Prefatory text deletion instructions focus on identifying and removing introductory or preparatory statements that don't contribute significant content. This might include phrases like "I'm going to talk about . . . " or "Let me start by saying . . . ". Repetitive text deletion instructions, on the other hand, look for content that's been stated before in the transcript file object and remove subsequent repetitions. The main use of these advanced text deletion instructions is to further refine the transcript file object, making it more concise and focused. This can lead to more efficient video edits, clearer transcript file objects for reading, and more accurate summarization of video content.

By removing unnecessary prefatory statements and repetitions, the resulting content becomes more direct and engaging. Alternative implementations or uses might include options for different levels of aggressiveness in text removal, or the ability to target specific types of content for removal based on the needs of particular industries or content types. The video editing system could also potentially be extended to handle multi-modal content, considering not just the transcript file object but also visual elements in the video when deciding what text to remove.

The term "prefatory text deletion instructions" refers to a specific subset of advanced text deletion instructions that focus on identifying and removing introductory or preparatory statements from a transcript file object. These are statements that don't contribute significant content to the main message but serve as lead-ins or framing devices. The video editing system may use a combination of rule-based approaches, statistical models, machine learning models, text classifiers, natural language processing techniques, and the like to identify prefatory text. This might include the use of machine learning models trained to recognize common prefatory patterns, as well as rule-based systems for identifying specific types of introductory phrases. The video editing system may employ techniques like discourse structure analysis to understand the role of different sentences within the overall structure of the speech.

In a computer system, these prefatory text deletion instructions are typically generated by a service or module within the larger iterative multi-loop refinement operations service of the video editing system. The module takes a transcript file object as input and generates detailed instructions including prompts that are configured to cause a large language model to generate a modified or refined version of the transcript file object with prefatory text removed. In some embodiments, the module might use data structures like parse trees or semantic graphs to represent the structure of the text and identify prefatory elements.

When executed, in various embodiments by the large language model, the prefatory text deletion instructions analyze the transcript file object, particularly focusing on the beginning of the speech and the start of new topics or sections. They cause identification of phrases and sentences that match patterns typical of prefatory statements. This could include phrases like "I'd like to begin by . . . ", "Before we start . . . ", or "The topic of my talk is . . . ". The video editing system may also look for more subtle prefatory content, such as excessive background information or overly detailed introductions. The primary use of these prefatory text deletion instructions is to make the transcript file object more concise and to the point. By removing unnecessary prefatory text, the resulting content gets to the main points more quickly, which can be particularly beneficial in video editing. It helps create a more engaging final product by reducing the time spent on introductions and getting to the core content faster.

One important aspect of prefatory text deletion is distinguishing between unnecessary prefatory statements and important contextual information. The prefatory text deletion instructions need to be sophisticated enough to retain introductory content that's important for understanding the main points. This might involve semantic analysis to determine the relevance of introductory statements to the overall content. Alternative implementations or uses might include options for different levels of prefatory text removal, from light (removing only the most obvious introductory phrases) to aggressive (attempting to remove all detected prefatory content). Throttling the video editing system from light to aggressive may be accomplished using modified prefatory text deletion instructions generated in response to user engagement with a refinement adjustment interface component as discussed below. The video editing system could also be extended to handle prefatory text in different contexts, such as academic lectures, business presentations, or casual conversations, each of which might have different norms for introductory content.

The term "repetitive text deletion instructions" refers to a specific subset of advanced text deletion instructions that are designed to identify and remove repeated content within a transcript file object. These repetitive text deletion instructions focus on causing detection of instances where the same information or very similar information is stated multiple times throughout the text. The video editing system may use a combination of rule-based approaches, statistical models, machine learning models, text classifiers, natural language processing techniques, and the like to identify repetitive text. This might include the use of semantic similarity measures, such as cosine similarity of word embeddings or more sophisticated sentence embedding techniques.

In a computer system, these repetitive text deletion instructions typically generated by a service or module within the larger iterative multi-loop refinement operations service of the video editing system. The module takes a transcript file object as input and generates detailed instructions including prompts that are configured to cause a large language model to generate a modified or refined version of the transcript file object with repetitive content removed or consolidated. In some embodiments, the module might use data structures like suffix trees or inverted indexes to cause efficient identification of repeated sequences of words or phrases.

When executed, in various embodiments by the large language model, the repetitive text deletion instructions analyze the entire transcript file object, comparing different sections against each other. They identify phrases, sentences, or even paragraphs that convey substantially the same information as content that appeared earlier in the transcript file object. This could include exact repetitions, paraphrases, or restatements of the same ideas in different words. The video editing system needs to be sophisticated enough to distinguish between intentional repetition for emphasis (which might be retained) and unnecessary redundancy. One important use of these repetitive text deletion instructions is to make the transcript file object more concise and efficient. By removing or consolidating repetitive content, the resulting text becomes more streamlined and easier to follow. This is particularly beneficial for video editing, as it can help reduce the overall length of the video without losing important content. It also improves the clarity of the message by reducing redundancy.

An important aspect of repetitive text deletion is maintaining the coherence and flow of the text after removals. The repetitive text deletion instructions need to be careful not to create abrupt transitions or lose important context when removing repetitions. This might involve sophisticated text generation or bridging techniques to smooth over the gaps left by removed content. Alternative implementations or uses might include options for different levels of repetition removal, from light (removing only exact or near-exact repetitions) to aggressive (attempting to consolidate all similar ideas). The video editing system could also be extended to handle repetition across different modalities, such as identifying when spoken content repeats information already presented in visual slides. Additionally, the video editing system could offer features to highlight repetitions for manual review rather than automatically removing them, allowing for more nuanced decision-making in cases where repetition might serve a rhetorical purpose.

The term "video edit instructions" refers to a set of commands or directives that specify to a video trim service how a video recording should be modified or edited. These video edit instructions are generated based on the analysis and refinement of the transcript file object, and they guide the process of creating an updated, more polished version of the original video by the video trim service. The technical implementation of video edit instructions typically involves a combination of natural language processing (NLP) and video processing techniques. The video editing system needs to map the refined transcript file object back to the original video timeline, which requires precise synchronization between the text and the audio/video streams. This might involve techniques like forced alignment, where the video editing system matches the transcript file object to the audio waveform at a phoneme level. In a computer system, video edit instructions would likely be represented as a structured data format, such as JSON or XML. Each video edit instruction might include fields like start time, end time, action type (e.g., cut, speed up, add transition), and any additional parameters specific to the action.

Various example video editing systems that are configured to generate video edit instructions are adapted to consider not just the text refinements, but also visual continuity and audio smoothness. When generated, the video edit instructions are created by analyzing the differences between the original transcript file object and the refined transcript file object. For each section of text that was removed or modified, a corresponding video edit instruction is created. This might involve instructions to cut out certain segments of video, adjust the playback speed of others, or add transitions to smooth over edits. The primary use of these video edit instructions is to guide the automatic or semi-automatic editing of the video content. They serve as a bridge between the text-based refinement process and the actual video editing.

When executed by the video trim service, these video edit instructions result in an updated recorded video object that reflects the refinements made to the transcript file object. An important aspect of generating effective video edit instructions is maintaining the visual and auditory coherence of the video after edits. This might involve sophisticated techniques for creating seamless transitions, adjusting audio levels, or even synthesizing bridging content where necessary. The video editing system needs to balance the goal of following the refined transcript file object closely with the need to produce a visually and aurally pleasing final product. Alternative implementations or uses might include generating multiple sets of video edit instructions with different levels of aggressiveness, allowing users to choose between more or less heavily edited versions.

The term "text confinement instructions" refers to a set of rules, inputs, prompts, workflows, or algorithms designed to enable iterative multi-loop refinement operations without introducing hallucinations or other added transcript content. Text confinement instructions are one useful component of the video editing system's transcript refinement process, ensuring that the refined transcript remains faithful to the original content while removing unnecessary elements.

Technically, text confinement instructions encompass a variety of text processing operations and constraints. These include normalized text operations such as removing case and punctuation, text insertion prohibitions, strike-through removal indications, markdown text markup operations in lieu of strike-through formatting, and text tokenization operations. In some embodiments, the video editing system may generate text confinement instructions that use regular expressions for basic text normalization, custom algorithms for enforcing insertion prohibitions, and specialized parsers for handling markdown syntax.

Text confinement instructions are generated primarily within the iterative multi-loop transcript refinement operations service of the video editing system. They serve as guardrails during the refinement process, ensuring that the large language model or other refinement algorithms do not introduce new content or make unintended modifications to the transcript. By strictly limiting operations to removal and specific formatting changes, these instructions help maintain the integrity of the original speech while allowing for necessary edits.

The functionality of text confinement instructions is closely tied to other components of the video editing system. They interact with the text disfluencies deletion instructions and advanced text deletion instructions, providing a framework within which these more specific deletion operations can occur safely. For data objects generated during the refinement process, such as the refined transcript file object, the text confinement instructions ensure that these objects maintain a structure and content that is consistent with the original transcript file object, facilitating accurate video edit instruction generation.

Alternative implementations of text confinement instructions might include adaptive constraints that adjust based on the specific content or context of the video being edited. For instance, the system could employ different levels of confinement for technical presentations versus casual conversations, or adjust the strictness of confinement based on user preferences, the intended audience of the video, or on user engagement with a refinement adjustment interface component.

The term "text confinement threshold" refers to a parameter for expanding or constraining editing of transcript file objects via the iterative multi-loop refinement operations service and/or a large language model. This threshold acts as a control mechanism, determining the extent to which the video editing system can modify the original transcript during the refinement process.

From a technical perspective, the text confinement threshold is likely implemented as a numerical value or set of values that guide the behavior of the iterative multi-loop refinement operations service. It may be represented in the system's data structures as a float or integer, potentially with associated metadata describing its current setting and impact on various refinement operations. The threshold could be applied at multiple levels of the refinement process, influencing decisions made by both rule-based systems and machine learning models.

In the video editing system's architecture, the text confinement threshold might be managed by a dedicated module within the iterative multi-loop refinement operations service. This module would be responsible for interpreting the threshold value, applying it to various refinement operations (i.e., by programmatically configuring various text refinement operations), and potentially adjusting it based on feedback or results. The threshold could be implemented as a global setting affecting all refinement operations, or as a more granular set of parameters tailored to specific types of edits or content.

The text confinement threshold is primarily used to balance the trade-off between conciseness and fidelity to the original content. A lower threshold would result in more conservative editing, removing only the most obvious disfluencies or repetitions. A higher threshold would allow for more aggressive refinement, potentially removing larger segments of text deemed unnecessary or redundant. The threshold interacts closely with other components of the system, such as the text disfluencies deletion instructions and advanced text deletion instructions, modulating their behavior based on its current setting.

Functionally, the text confinement threshold may be established, at least in part, based on a refinement slider interface (e.g., a refinement adjustment interface component) presented to the user. This allows for dynamic adjustment of the refinement process, giving users control over the balance between conciseness and completeness in the final video. The system may need to translate user input from this interface into specific threshold values that can be interpreted by the refinement algorithms.

Alternative implementations or uses of the text confinement threshold might include adaptive thresholds that automatically adjust based on the content type, speaker characteristics, or target audience of the video. The system could also potentially use machine learning techniques to optimize the threshold over time, learning from user preferences and feedback to improve its default settings for different types of content.

FIG. 1 illustrates a block diagram of a video editing system 100. The video editing system 100 comprises at least one processor and a memory storing instructions that are operable, when executed by the processor, to cause the video editing system 100 to perform various operations.

The video editing system 100 includes an iterative multi-loop refinement operations service 102, a video trim service 109, and interfaces with a large language model 110 and a video object data store 112. The video object data store 112 comprises an updated recorded video object store 114 and a recorded video object store 116.

The iterative multi-loop refinement operations service 102 contains text disfluencies deletion instructions 104, prefatory text deletion instructions 106, and repetitive text deletion instructions 108. These instructions work in conjunction with the large language model 110, which communicates bidirectionally and iteratively with the video editing system 100.

The video editing system 100 receives a recorded video object that is configured to cause playback, on a client device 118A, 118B, or 118C, of a video recording of at least one speaker. The video editing system 100 generates a transcript file object of the video recording based on the received recorded video object. In some aspects, the transcript file object is generated in real-time as the video is being recorded or played back. This process may involve breaking the audio stream into short segments, typically lasting a few seconds each. These segments are then processed through a speech recognition model that converts the audio into text. The model may use techniques such as acoustic modeling and language modeling to accurately transcribe the speech. As each segment is transcribed, it is immediately added to the growing transcript. This approach allows for low-latency transcription, enabling near real-time availability of the transcript for editing purposes. The instantaneous transcription process may also incorporate speaker diarization to distinguish between different speakers in the video, further enhancing the usefulness of the transcript for editing tasks. An example instantaneous transcription process is disclosed in commonly owned U.S. patent application Ser. No. 18/759,644 entitled "Instantaneous Media Stream Transcription Systems and Methods", which was filed Jun. 28, 2024 and is hereby incorporated by reference in its entirety.

The video editing system 100 applies iterative multi-loop transcript refinement operations to the transcript file object. These operations involve inputting the transcript file object and text disfluencies deletion instructions 104 to the large language model 110 to generate a first refined transcript file object. Subsequently, the iterative multi-loop refinement operations service 102 inputs the first refined transcript file object and advanced text deletion instructions to the large language model 110 to generate a second refined transcript file object. In various embodiments, the advanced text deletion instructions comprise at least one of: prefatory text deletion instructions 106 or repetitive text deletion instructions 108.

Based on the second refined transcript object, the video editing system 100 generates video edit instructions. These instructions are then sent to the video trim service 109, which generates an updated recorded video object based on the video edit instructions. Video trimming operations may be performed in real-time or as a background process, depending on the complexity of the edit and the processing capabilities of the video editing system 100. The resulting trimmed video object (e.g., updated recorded video object) may then be passed to a video segment stitching service for integration with other video video segments of the recorded video object. An example video trimming process is disclosed in commonly owned U.S. Pat. No. 11,462,247 entitled "Instant Video Trimming and Stitching and Associated Methods and Systems", which was filed Dec. 29, 2021 and is hereby incorporated by reference in its entirety.

The video object data store 112 maintains a bidirectional connection with the video editing system 100 for data exchange. The recorded video object store 116 stores the initial recorded video object, while the updated recorded video object store 114 stores the refined video object after processing.

The video editing system 100 interfaces with multiple client devices, including client device 118A (shown as a mobile device), client device 118B (shown as a laptop computer), and client device 118C (shown as a desktop computer). These client devices communicate bidirectionally with the video editing system 100, allowing for the transmission of recorded video objects and the reception of updated recorded video objects for later playback.

The system enables communication between the various components through bidirectional connections, facilitating data flow between the client devices 118A, 118B, 118C, the video object data store 112, and the large language model 110. This interconnected structure allows for efficient processing and refinement of video content through the iterative multi-loop refinement operations.

Figure 2:
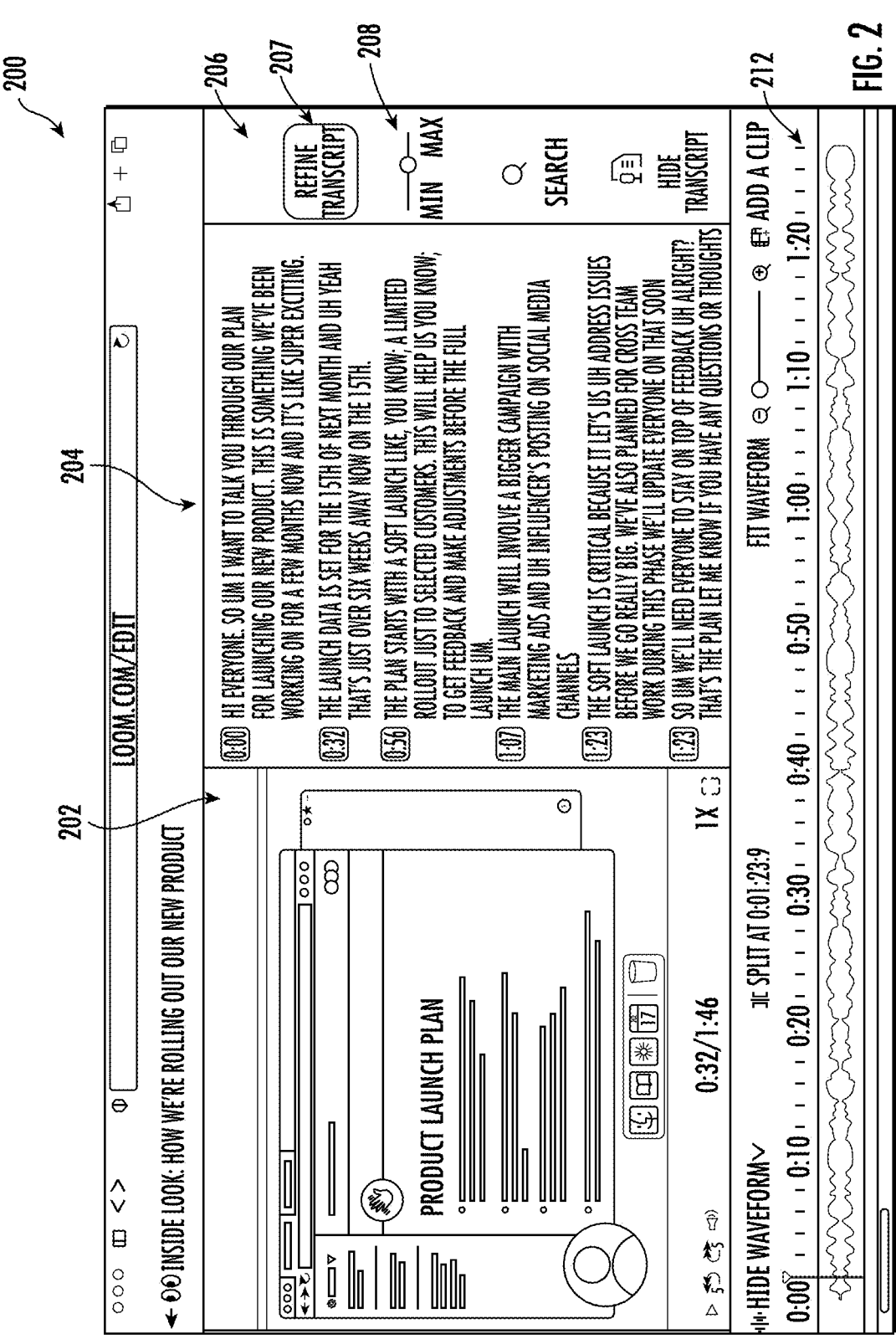
FIG. 2 illustrates an example video editing interface for the video editing system of FIG. 1, according to an embodiment.

FIG. 2 illustrates a video editing interface 200 for editing and refining video content. The video editing interface 200 includes multiple components that enable users to view, edit, and refine video recordings and associated transcripts.

The video editing interface 200 comprises a recorded video object interface 202 that displays video content. The recorded video object interface 202 shows an video directed to a "Product Launch Plan" presentation with associated controls for playback and navigation. Users interact with the recorded video object interface 202 to view and control the playback of the video recording.

Adjacent to the recorded video object interface 202 is a transcript editing interface 204. The transcript editing interface 204 presents the corresponding transcript text of the video recording displayed in the recorded video object interface 202. The transcript editing interface 204 shows the transcript text with associated timestamps, allowing users to view and edit the transcript content directly.

Positioned alongside the transcript editing interface 204 is a transcript refinement interface 206. The transcript refinement interface 206 incorporates tools for automatically refining and adjusting the transcript content to support video trim operations. Within the transcript refinement interface 206 is a refinement launch interface component 207. The refinement launch interface component 207 allows users to initiate the iterative multi-loop transcript refinement operations. In the depicted embodiment, the refinement launch interface component 207 is a button or other similar graphical user interface feature.

The transcript refinement interface 206 also includes a refinement adjustment interface component 208. The depicted refinement adjustment interface component 208 features a sliding element that users can move between minimum and maximum adjustment settings. This sliding element establishes a text confinement threshold for the iterative multi-loop transcript refinement operations. By adjusting the slider, users control the parameters for transcript refinement, influencing how aggressively the system applies text confinement instructions and/or setting a text confinement threshold for use during the transcript refinement process.

Below the transcript editing interface 204 is a waveform selector interface 212. The waveform selector interface 212 displays a visual representation of the audio waveform corresponding to the video content. The waveform selector interface 212 includes options for hiding the waveform, deleting selections, and adding clips, providing users with additional tools for precise audio-based editing.

The layout of the video editing interface 200 allows users to simultaneously view and interact with the video content, transcript text, and refinement controls. This integrated approach enables efficient editing and refinement of video recordings based on transcript analysis and user-defined parameters.

FIG. 3 illustrates a text disfluencies deletion interface 300 that provides guidance for editing transcript content. The text disfluencies deletion interface 300 includes a disfluencies deletion prompt interface 302 that displays specific instructions for processing and modifying transcript text.

The disfluencies deletion prompt interface 302 implements text confinement instructions to guide users in prompting a large language model to edit transcript content. These text confinement instructions are designed to enable iterative multi-loop refinement operations without introducing unintended modifications or additional transcript content. The text confinement instructions include normalized text operations, text insertion prohibitions, and markdown text markup operations.

In some cases, the text confinement instructions comprise a text confinement threshold. This threshold is used to expand or constrain the editing of transcript file objects during the iterative multi-loop refinement operations. One example text confinement threshold is a "temperature" or value between 0 and 1 that is used to control of text outputs of large language models. In some embodiments, the text confinement threshold is established based on numerical values set by user engagement with the refinement adjustment interface component 208 depicted in FIG. 2.

The disfluencies deletion prompt interface 302 specifies that large language model editing capabilities are limited to striking through text to indicate removals. This aligns with the functionality of the text disfluencies deletion instructions, which are configured to strike through text for deletion. The interface explicitly prohibits modifying or adding new content, ensuring that the annotated transcript remains an exact, verbatim copy of the input transcript, with the only permitted modification being strike-through markup.

In some examples, the large language model uses markdown text markup format to strike through text for deletion. This approach is illustrated in the example provided within the disfluencies deletion prompt interface 302, where strikethrough annotations are represented using tilde characters to mark the beginning and end of text segments to be deleted.

The text disfluencies deletion interface 300 provides examples of how to apply the text confinement instructions. For instance, the interface demonstrates the use of strikethrough markup to indicate text for removal without altering the original content. The interface also explicitly prohibits grammar corrections, spelling fixes, or insertion of punctuation or new words, reinforcing the strict adherence to the text confinement instructions.

Figure 4:
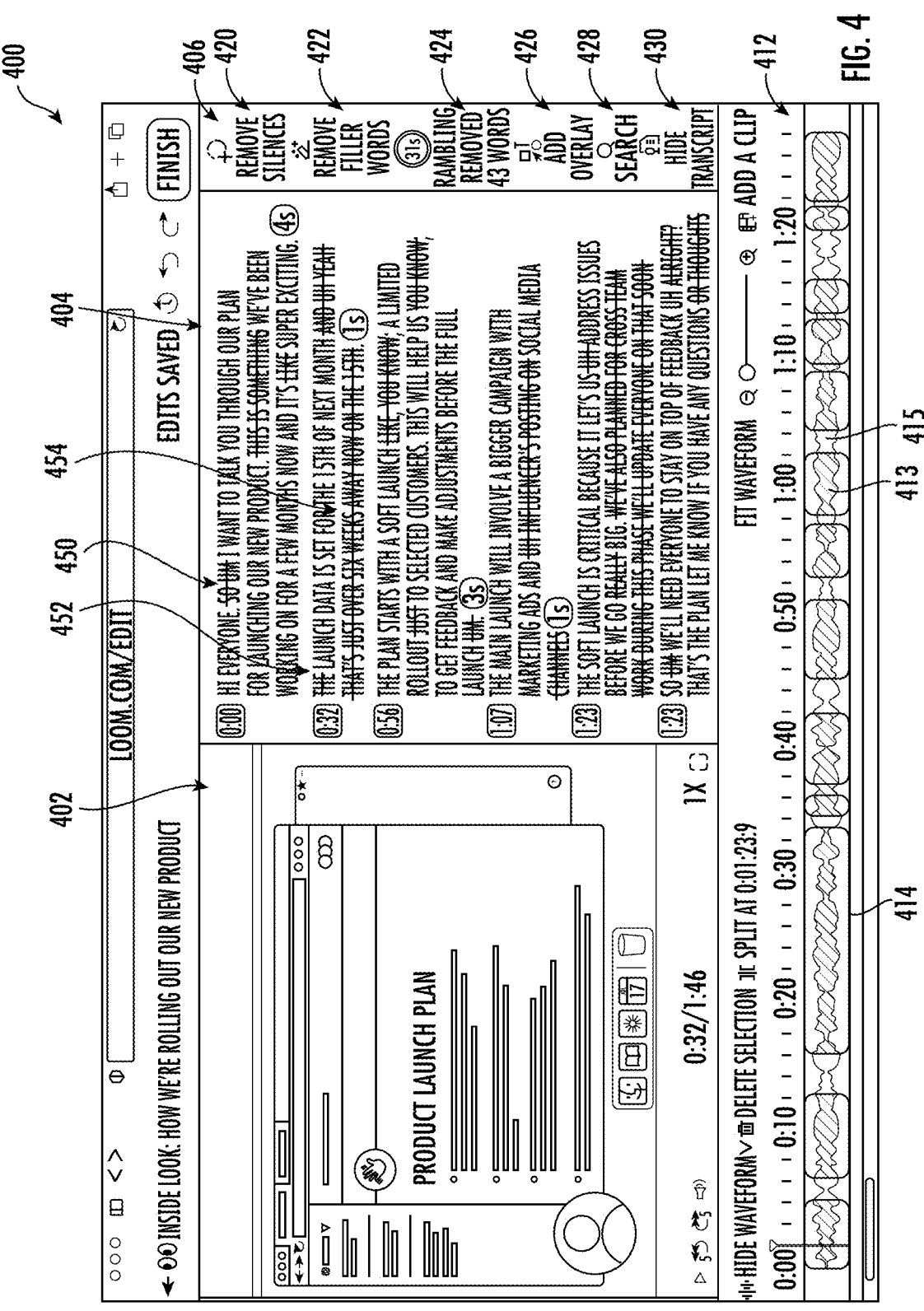
FIG. 4 illustrates a block diagram of a video editing interface demonstrating applied iterative multi-loop refinement operations, according to an embodiment.

The video editing interface 400 depicted in FIG. 4 illustrates the application of iterative multi-loop transcript refinement operations to the transcript shown in FIG. 2. These operations are triggered by user engagement with the refinement launch interface component 207.

FIG. 4 shows a video editing interface 400 that includes a recorded video object interface 402 and a transcript editing interface 404 positioned side by side. The transcript editing interface 404 displays a transcript of the recorded video object shown in the recorded video object interface 402. The transcript has been edited using iterative multi-loop refinement operations, as evidenced by the text disfluencies deletions 450, prefatory text deletions 452, and repetitive text deletions 454 visible within the transcript. While not separately called out with element labels, the depicted transcript includes additional edits based on text disfluency deletion instructions and other advanced text deletion instructions (e.g., prefatory text deletion instructions, repetitive text deletion instructions, etc.) as shown. The depicted transcript was iteratively assembled based on updated refined transcript objects generated by a large language model in response to iterative multi-loop transcript refinement operations.

A transcript refinement interface 406 is positioned along the right side of the transcript editing interface 404. The transcript refinement interface 406 includes several new user interface components that were not present in FIG. 2. These new components include a silence removal control interface 420, a first refinement results interface 422, and a second refinement results interface 424.

The silence removal control interface 420 allows users to automatically detect and remove periods of silence in the video. This feature enhances the efficiency of the editing process by eliminating the need for manual silence detection and removal.

The first refinement results interface 422 and the second refinement results interface 424 display various example outcomes of the transcript refinement process. The first refinement results interface 422 indicates that 31 seconds of transcript (and associated video) were removed based on the iterative multi-loop transcript refinement operations. The second refinement results interface 422 indicates that 43 words (and associated video) were removed from the transcript based on the iterative multi-loop transcript refinement operations. Such indicators enhance user confidence that sufficient transcript refinement has occurred while also positioning the user to spot circumstances where too much trimming may be set to occur thereby risking unintended video content loss.

Additional control interfaces in the video editing interface 400 include an overlay control interface 426 and a search control interface 428. These interfaces provide users with more advanced editing capabilities and content navigation options.

A transcript toggle interface 430 allows users to hide or show the transcript, providing flexibility in the editing workspace layout.

At the bottom of the video editing interface 400, a waveform selector interface 412 displays the audio waveform representation 413 of the video content. Once one or more iterative multi-loop transcript refinement operations have been performed, the waveform selector interface 412 is configured to visually segment the displayed audio waveform representation 413 into untrimmed waveform regions 414 and trimmed waveform regions 415. In the depicted embodiment, the untrimmed waveform regions 414 are enclosed by emphasis bubble elements while trimmed waveform regions 415 are not. The waveform selector interface 412 includes options for hiding the waveform, deleting selections, and splitting the timeline at specific timestamps, offering precise control over the audio-visual elements of the video.

The combination of these features in the video editing interface 400 enhances the overall editing process by providing intuitive controls for transcript refinement, silence removal, and content navigation. The iterative multi-loop transcript refinement operations, coupled with the various control interfaces, enable users to create more concise and professional video content efficiently.

Figure 5:
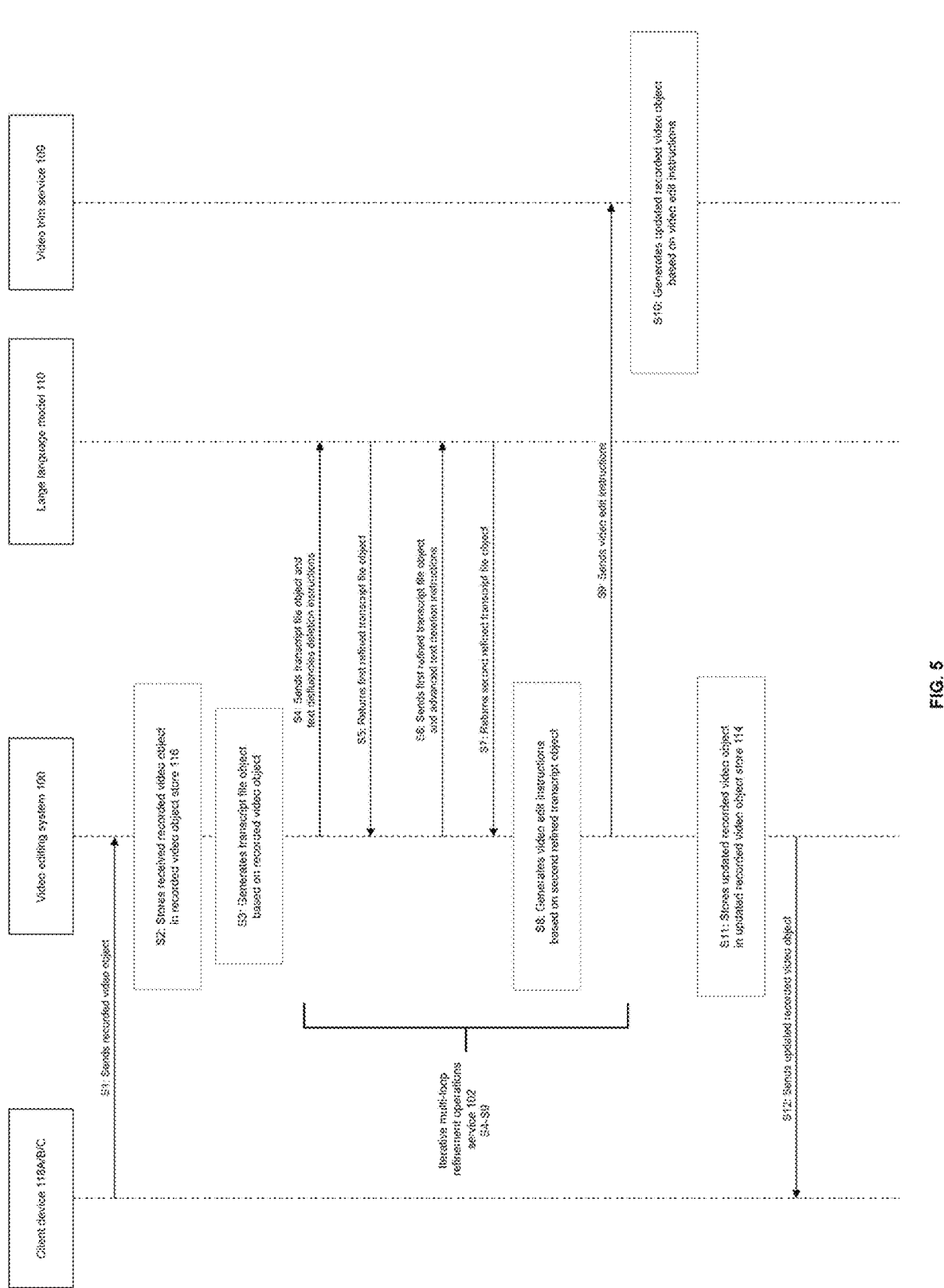
FIG. 5 illustrates a sequence diagram showing interactions between components of the video editing system of FIG. 1, according to aspects of the present disclosure.

FIG. 5 illustrates a sequence diagram depicting interactions between components of a video editing system 100 during a video editing workflow. The sequence diagram shows the flow of operations between one or more client devices 118A/B/C, the video editing system 100 including an iterative refinement operations service 102, and a large language model 110, and a video trim service 109.

The workflow begins with step S1, where one or more client devices 118A/B/C sends a recorded video object to the video editing system 100. In step S2, the video editing system 100 stores the received recorded video object in a recorded video object store 116.

Following storage, in step S3, the video editing system 100 generates a transcript file object based on the recorded video object. Steps S4-S9 are performed by the iterative refinement operations service 102 of the video editing system 100.

In step S4, the iterative refinement operations service 102 sends the transcript file object along with text disfluencies deletion instructions to the large language model 110. The large language model 110 processes this input and returns a first refined transcript file object in step S5.

The iterative refinement operations service 102 then sends the first refined transcript file object along with advanced text deletion instructions to the large language model 110 in step S6. The large language model 110 returns a second refined transcript file object in step S7.

Based on the second refined transcript file object, the iterative refinement operations service 102 generates video edit instructions in step S8. These instructions are then sent to the video trim service 109 in step S9.

In step S10, the video trim service 109 generates an updated recorded video object based on the video edit instructions. The video editing system 100 then stores the updated recorded video object in an updated recorded video object store 114 in step S11.

Finally, in step S12, the video editing system 100 sends the updated recorded video object back to one or more of client devices 118A/B/C, completing the workflow and enabling playback of the updated recorded video object.

The iterative refinement operations service 102 breaks the transcript refinement task into subtasks, with each subsequent call to the large language model 110 building on the work done in the previous call. For long transcripts, the iterative refinement operations service 102 chunks up the transcript to improve model output accuracy.

In some embodiments, the iterative refinement operations service 102 normalizes the transcript text by removing casing and punctuation to work around potential hallucinations in the large language model 110 output. The large language model 110 uses a text confinement threshold (e.g., temperature) of 0 for maximum accuracy in processing the transcript. In other embodiments, different text confinement thresholds (e.g., 0.5, 1, etc.) may be used. In some embodiments, text confinement thresholds may be set based on user engagement with the refinement adjustment interface 208 shown in FIG. 2.

After the video trim service 109 processes the video based on the edit instructions, the depicted video editing system 100 uses FFmpeg to stitch together video segments, creating the final updated recorded video object. In other embodiments, different video stitching techniques or algorithms may be used.

FIG. 6 illustrates a flowchart of a process 600 for refining and editing video content based on transcript analysis. The process 600 implements the concepts of transcript refinement and video editing discussed earlier in the specification.

The process 600 begins at a step 601 with receiving a recorded video object. The recorded video object is configured to cause playback, on a client device, of a video recording of at least one speaker.

At a step 602, the process 600 generates a transcript file object based on the received recorded video object. This step involves converting the audio content of the recorded video object into text form.

The process 600 then proceeds to iterative multi-loop transcript refinement operations 603. The iterative multi-loop transcript refinement operations 603 comprise multiple steps that refine the transcript file object through iterative processing.

The iterative multi-loop transcript refinement operations 603 begin with a step 604, where the transcript file object and text disfluencies deletion instructions are input to a large language model. Following this, at a step 606, a first refined transcript file object is generated by the large language model based on the input.

The iterative multi-loop transcript refinement operations 603 continue with a step 608, where the first refined transcript file object and advanced text deletion instructions are input to the large language model. The advanced text deletion instructions comprise at least one of: prefatory text deletion instructions and/or repetitive text deletion instructions. This leads to a step 610, where a second refined transcript file object is generated by the large language model based on the new input.

The depicted multi-loop transcript refinement operations 603 begin with transcript disfluency deletion and then proceed to other advanced deletion instructions such as prefatory text deletion and repetitive text deletion. However, in other embodiments, the multi-loop transcript refinement operations 603 may proceed in alterative orders such that repetitive or prefatory text deletion operations occur before text disfluency deletion.

After the iterative multi-loop transcript refinement operations 603 are complete, the process 600 proceeds to a step 612, where video edit instructions are generated based on the second refined transcript file object. These video edit instructions are derived from the refinements made to the transcript during the iterative multi-loop transcript refinement operation 603.

Finally, at a step 614, the process 600 generates an updated recorded video object using the video edit instructions. This updated recorded video object incorporates the refinements made to the transcript, resulting in a more concise and polished video content.

While not explicitly shown in FIG. 6, various steps of the iterative multi-loop transcript refinement operations may be modified or updated with text confinement instructions and appended to text confinement thresholds. These modifications aim to improve large language model output accuracy and reduce hallucinations.

The iterative multi-loop transcript refinement operations can be applied to transcripts in multiple languages. This capability allows the video editing system to process and refine video content in various languages, expanding its utility across different linguistic contexts.

Additional Technical Aspects

The terms "client device", "computing device", "user device", and the like may be used interchangeably to refer to computer hardware that is configured (either physically or by the execution of software) to access one or more of an application, service, or repository made available by a server (e.g., apparatus of the present disclosure) and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure.

The terms "data," "content," "digital content," "digital content object," "signal," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use computer-readable storage medium, other types of computer-readable mediums can be substituted for or used in addition to the computer-readable storage medium in alternative embodiments.

The terms "application," "software application," "app," "product," "service" or other similar terms refer to a computer program or group of computer programs designed to perform coordinated functions, tasks, or activities for the benefit of a user or group of users. A software application can run on a server or group of servers (e.g., physical or virtual servers in a cloud-based computing environment). In certain embodiments, an application is designed for use by and interaction with one or more local, networked or remote computing devices, such as, but not limited to, client devices. Non-limiting examples of an application comprise project management, workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The terms "machine learning module," "machine learning model," "ML model(s)", or "artificial intelligence model(s)" refer to a machine learning or deep learning task or algorithm. The term "machine learning" refers to a method used to devise complex models and algorithms that lend themselves to prediction or content generation. A machine learning model is a computer-implemented algorithm that may learn from data with or without relying on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, or the like.

A machine learning model is initially fit or trained on a training dataset (e.g., a set of examples used to fit the parameters of the model). The model may be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted.

The machine learning models as described herein may make use of multiple ML engines (e.g., for analysis, transformation, and other needs). The system may train different ML models for different needs and different ML-based engines. The system may generate new models (based on the gathered training data) and may evaluate their performance against the existing models. Training data may include any of the gathered information, as well as information on actions performed based on the various recommendations.

The ML models may be any suitable model for the task or activity implemented by each ML-based engine. Machine learning models may be some form of neural network. The underlying ML models may be learning models (supervised or unsupervised). As examples, such algorithms may be prediction (e.g., linear regression) algorithms, classification (e.g., decision trees) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders), speech-to-text models, or generative models (e.g., GANs).

The ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models may be generative models (such as Generative Adversarial Networks or VQGAN models).

In various embodiments, the ML models may undergo a training or learning phase before they are released into a production or runtime phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein. The ML models herein may undergo a second or multiple subsequent training phases for retraining the models.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The phrases "in one embodiment," "according to one embodiment," "in one aspect", and the like generally mean that the particular feature, structure, or characteristic following the phrase may be included in the at least one embodiment of the present invention and may be included in more than one embodiment of the present invention (importantly, such phrases do not necessarily refer to the same embodiment).

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items.

The term "or" is used herein in both the alternative and conjunctive sense, unless otherwise indicated.

While this specification contains many specific implementation details, these should not be construed as limitations on the scope of any disclosures or of what may be claimed, but rather as description of features specific to particular embodiments of particular disclosures. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems may generally be integrated together in a product or packaged into multiple products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

The invention claimed is:

1. A video editing system comprising at least one processor and a memory storing instructions that are operable, when executed by the processor, to cause the video editing system to:

receive a recorded video object that is configured to cause playback, on a client device, of a video recording of at least one speaker;

generate a transcript file object of the video recording based on the recorded video object;

apply iterative multi-loop transcript refinement operations to the transcript file object, wherein the iterative multi-loop transcript refinement operations comprise:

inputting the transcript file object and text disfluencies deletion instructions to a large language model to generate a first refined transcript file object, and inputting the first refined transcript file object and advanced text deletion instructions to the large language model to generate a second refined transcript file object, wherein the advanced text deletion instructions comprise at least one of: prefatory text deletion instructions or repetitive text deletion instructions;

generate video edit instructions based on the second refined transcript file object; and generate an updated recorded video object based on the video edit instructions.

2. The video editing system of claim 1, wherein the video edit instructions comprise trim ranges defined by the large language model based on the text disfluencies deletion instructions, the prefatory text deletion instructions, or the repetitive text deletion instructions.

3. The video editing system of claim 1, wherein the iterative multi-loop transcript refinement operations comprise text confinement instructions.

4. The video editing system of claim 3, wherein the text confinement instructions comprise a text confinement threshold.

5. The video editing system of claim 1, wherein the video editing system is further configured to:

generate a user interface comprising a refinement adjustment interface component;

receive user input via the refinement adjustment interface component; and adjust parameters of the iterative multi-loop transcript refinement operations based on the received user input.

6. The video editing system of claim 1, wherein the video editing system is further configured to:

chunk the transcript file object into multiple segments;

apply the iterative multi-loop transcript refinement operations to each segment separately; and combine the refined segments to generate the second refined transcript file object.

7. The video editing system of claim 1, wherein generating the updated recorded video object comprises:

identifying video segments corresponding to portions of the second refined transcript file object;

trimming the identified video segments based on the video edit instructions; and stitching the trimmed video segments together to create the updated recorded video object.

8. A computer-implemented method comprising:

receiving, by a video editing system, a recorded video object that is configured to cause playback, on a client device, of a video recording of at least one speaker;

generating, by the video editing system, a transcript file object of the video recording based on the recorded video object;

applying, by the video editing system, iterative multi-loop transcript refinement operations to the transcript file object, wherein the iterative multi-loop transcript refinement operations comprise:

inputting the transcript file object and text disfluencies deletion instructions to a large language model to generate a first refined transcript file object, and inputting the first refined transcript file object and prefatory text deletion instructions to the large language model to generate a second refined transcript file object;

generating, by the video editing system, video edit instructions based on the second refined transcript file object; and generating, by the video editing system, an updated recorded video object based on the video edit instructions.

9. The computer-implemented method of claim 8, wherein the iterative multi-loop transcript refinement operations further comprise:

inputting the second refined transcript file object and repetitive text deletion instructions to the large language model to generate a third refined transcript file object; and wherein the generating, by the video editing system, video edit instructions is based on the third refined transcript file object.

10. The computer-implemented method of claim 8, wherein the video edit instructions comprise trim ranges defined by the large language model based on the text disfluencies deletion instructions or the prefatory text deletion instructions.

11. The computer-implemented method of claim 8, wherein the iterative multi-loop transcript refinement operations comprise text confinement instructions.

12. The computer-implemented method of claim 11, wherein the text confinement instructions comprise a text confinement threshold.

13. The computer-implemented method of claim 8, further comprising:

generating a user interface comprising a refinement adjustment interface component;

receiving user input via the refinement adjustment interface component; and adjusting parameters of the iterative multi-loop transcript refinement operations based on the received user input.

14. The computer-implemented method of claim 8, further comprising:

chunking the transcript file object into multiple segments;

applying the iterative multi-loop transcript refinement operations to each segment separately; and combining the refined segments to generate the second refined transcript file object.

15. The computer-implemented method of claim 8, wherein generating the updated recorded video object comprises:

identifying video segments corresponding to portions of the second refined transcript file object;

trimming the identified video segments based on the video edit instructions; and stitching the trimmed video segments together to create the updated recorded video object.

16. A non-transitory computer-readable storage medium storing instructions that, when executed by at least one processor of a video editing system, cause the video editing system to perform operations comprising:

receiving a recorded video object that is configured to cause playback, on a client device, of a video recording of at least one speaker;

generating a transcript file object of the video recording based on the recorded video object;

applying iterative multi-loop transcript refinement operations to the transcript file object, wherein the iterative multi-loop transcript refinement operations comprise:

inputting the transcript file object and text disfluencies deletion instructions to a large language model to generate a first refined transcript file object, and inputting the first refined transcript file object and advanced text deletion instructions to the large language model to generate a second refined transcript file object, wherein the advanced text deletion instructions comprise at least one of: prefatory text deletion instructions or repetitive text deletion instructions;

generating video edit instructions based on the second refined transcript file object; and generating an updated recorded video object based on the video edit instructions.

17. The non-transitory computer-readable storage medium of claim 16, wherein the video edit instructions comprise trim ranges defined by the large language model based on the text disfluencies deletion instructions, the prefatory text deletion instructions, or the repetitive text deletion instructions.

18. The non-transitory computer-readable storage medium of claim 16, wherein the iterative multi-loop transcript refinement operations comprise text confinement instructions.

19. The non-transitory computer-readable storage medium of claim 18, wherein the text confinement instructions comprise a text confinement threshold.

20. The non-transitory computer-readable storage medium of claim 16, wherein the operations further comprise:

generating a user interface comprising a refinement adjustment interface component;

receiving user input via the refinement adjustment interface component; and adjusting parameters of the iterative multi-loop transcript refinement operations based on the received user input.

\* \* \* \* \*